United States Patent
Hala et al.

(10) Patent No.: US 7,875,361 B2
(45) Date of Patent: Jan. 25, 2011

(54) METALLICALLY COATED LIGHT-REFLECTING COMPONENTS BASED ON THERMOPLASTIC MOLDING COMPOUNDS

(75) Inventors: Ralf Hala, Lindenberg (DE); Michael Kaisser, Trimmis (CH); Friedrich Buhler, Thusis (CH)

(73) Assignee: EMS-Chemie AG, Domat/EMS (CH)

( * ) Notice: Subject to any disclaimer, the term of this patent is extended or adjusted under 35 U.S.C. 154(b) by 89 days.

(21) Appl. No.: 11/374,297

(22) Filed: Nov. 9, 2006

(65) Prior Publication Data

US 2010/0323185 A1      Dec. 23, 2010

Related U.S. Application Data

(60) Provisional application No. 60/734,772, filed on Nov. 9, 2005.

(30) Foreign Application Priority Data

Nov. 9, 2005   (DE) ................. 10 2005 053 776
Sep. 22, 2006   (DE) ................. 10 2006 045 269

(51) Int. Cl.
   *B32B 27/34*   (2006.01)
(52) U.S. Cl. ................. 428/474.4; 428/323; 528/338; 528/339; 528/340
(58) Field of Classification Search ................. 528/346, 528/338, 339, 340; 428/323, 474.4
   See application file for complete search history.

(56) References Cited

U.S. PATENT DOCUMENTS

| | | | |
|---|---|---|---|
| 4,898,896 A | | 2/1990 | Maj et al. |
| 5,389,712 A | | 2/1995 | El Sayed et al. |
| 5,684,120 A | * | 11/1997 | Torre .................. 528/346 |
| 6,355,723 B1 | * | 3/2002 | van Baal et al. ............. 524/602 |

FOREIGN PATENT DOCUMENTS

| | | |
|---|---|---|
| DE | 2642244 A1 | 3/1977 |
| DE | 10224647 A1 | 12/2003 |
| EP | 0313436 A1 | 4/1989 |
| EP | 0553581 A2 | 8/1993 |
| EP | 0585056 A2 | 8/1993 |
| EP | 0696304 B1 | 2/1996 |
| EP | 0725101 A1 | 8/1996 |
| EP | 0863180 A1 | 9/1998 |
| EP | 0913421 A1 | 5/1999 |
| EP | 1312647 A2 | 11/2002 |
| EP | 1403306 A1 | 3/2004 |
| EP | 1416010 A2 * | 5/2004 |
| EP | 0332122 A2 | 3/2007 |
| WO | WO 2004/022638 A1 * | 3/2004 |

OTHER PUBLICATIONS

Gotz, W., "Form Folgt Blase", Plast Verarbeiter, vol. 53(5):24-26 (2002).

* cited by examiner

*Primary Examiner*—Callie E Shosho
*Assistant Examiner*—Elizabeth Robinson
(74) *Attorney, Agent, or Firm*—Browdy and Neimark, PLLC

(57) ABSTRACT

Relates to the use of a thermoplastic polymer molding compound for producing metallically coated light-reflecting components based on thermoplastics, which are suitable for operating temperatures of at least 200° C. The polymer molding compound used according to the present invention is characterized in that it comprises polyamides which are selected from a group which comprises homopolyamides, copolyamides, and mixtures (blends) made of homopolyamides and copolyamides and mixtures made of homopolyamides or copolyamides, these polyamides being selected from a group which comprises amorphous and transparent polyamides, and these polyamides having a glass transition temperature (Tg) of at least 205° C. Light-reflecting components produced according to the use according to the present invention are suitable for operating temperatures of at least 200° C. and comprise reflectors for traveling lights of vehicles, for signal and lighting devices, and reflectors for solar collectors.

26 Claims, No Drawings

METALLICALLY COATED LIGHT-REFLECTING COMPONENTS BASED ON THERMOPLASTIC MOLDING COMPOUNDS

RELATED PATENT APPLICATIONS

This patent application claims priority of the German Patent Application No. 10 2005 053 776.6 and the U.S. Provisional Application No. 60/734,772, both filed on Nov. 9, 2005. This patent application further claims priority of the German Patent Application No. 10 2006 045 269.0, filed on Sep. 22, 2006. The disclosure of all three priority applications is enclosed into this patent application by express reference for all purposes.

FIELD OF TECHNOLOGY

The present invention relates to the use of a thermoplastic polymer molding compound for producing metallically coated light-reflecting components, which are suitable for operating temperatures of at least 200° C., as well as to corresponding metallically coated light-reflecting components or light-reflecting components to be metallically coated.

Thermoplastics, from which light-reflecting components are produced through injection molding and subsequent metal coating (vacuum coating, often using aluminum), are known. Such components are headlight reflectors for automobiles, for example. In addition to the paraboloid headlights which were earlier used without exception, two basic types optimized in regard to light exploitation and space requirement have been developed, the projection headlight (ellipsoid, polyellipsoid) and the free-form headlight. Since the lenses of free-form headlights in particular are usually designed without profiling because of the optimized light exploitation and distribution of this reflector type, transparent lenses made of polycarbonate or glass are currently used. This increases the requirements on the surface quality of the elements (e.g., reflector, subreflector, frame), which are well visible from the outside, dimensional stability in the heat, low outgassing, mechanical strength, simple processing, and low manufacturing tolerances also being important.

Such headlight reflectors may also be subdivided into the actual reflector, essentially having a paraboloid shape, and a subreflector deviating more or less from the paraboloid shape. The reflector is the actual component reflecting the light for the desired illumination in a targeted way, which is normally situated in the immediate surroundings of the incandescent lamp generating the light. The lamp or incandescent bulb or a light source corresponding thereto also generates heat in addition to the light, so that the reflector is subjected to an operating temperature of approximately 180-220° C., depending on the construction.

The part of the light-reflecting components farther from the light source is referred to as a subreflector. Subreflectors often cover the area between the reflector and the lamp housing and/or the remaining vehicle body or also the transparent lamp cover. Subreflectors therefore do not have to be a paraboloid continuation, which is used to increase the light yield, rather, they may fulfill an aesthetic object in that they represent a reflecting surface which appears to enlarge the reflector. Due to the greater distance from the light source, an operating temperature of at most approximately 170° C. is to be expected for subreflectors.

Metal coatings which are applied to improve the reflection on the surfaces of the reflectors and to produce a design impression on the subreflectors are not subjected to direct mechanical strain, but are subjected to a thermal strain, such as expansion. Good adhesion of the metal coating to the reflector and subreflector surfaces is important, because bubble formation or even peeling impairs the light yield and would worsen the design impression.

The metal coating of the reflectors is typically performed on the basis of "vapor deposition methods". In vacuum, this coating is achieved by vapor deposition using PVD methods (PVD=physical vapor deposition, e.g., vapor deposition or sputtering of aluminum, for example) and/or using CVD methods (CVD=chemical vapor deposition, such as plasma-supported CVD). An important requirement for the plastic is therefore a low outgassing rate under the corresponding vacuum and temperature conditions. In order that the metal coating of the reflectors is not damaged in operation, increased outgassing also may not occur at the cited high operating temperatures. In addition, the reflectors are to be dimensionally stable in a temperature range from −50° C. to 220° C., i.e., the expansion and contraction behavior is to be as isotropic as possible so that—at least in the reflectors—the light yield and/or light bundling is not impaired. The metal coating preferably has an essentially identical expansion and contraction behavior as the reflectors, so that the tension or shear strain of the reflective layers is as small as possible. The danger of cracking or deformation in the reflective layers is thus additionally reduced.

A further requirement relates to the surface quality of the plastic surface to be coated (which is usually curved). Especially in reflectors in which the light yield is essential, the most homogeneous possible, smooth, high-gloss surface must be provided for the coating. Plastics which have poor flow or solidify too early and/or the addition of fillers often results in a rough, matte, or irregular impression in the injection mold, measured against the extremely high requirements of a mirror-smooth surface, even if the corresponding surface of the mold is polished to a high gloss.

RELATED PRIOR ART

Until now, duroplastics have largely been used for producing reflectors, and more rarely also thermoplastics. Of the latter, the primarily used amorphous thermoplastics, e.g., polyetherimide (PEI), polyamidimide (PAI) or polysulfones, e.g. polyethersulfone (PES) or polysulfone (PSU) or polyphenylene ethersulfone (PPSU), have a high to very high glass transition temperature (Tg) (cf., for example, PAI TORLON® from Solvay Advanced Polymers). These amorphous high Tg thermoplastics may be used without fillers to produce reflector blanks having an outstanding surface smoothness. The reflector blanks may be metal coated directly. However, the price of the cited amorphous high Tg thermoplastics, which is sometimes very high, is a disadvantage for mass production. In addition, the processing of these high Tg thermoplastics is sometimes difficult.

The highest temperatures naturally occur in the illumination unit. Therefore, until now the reflectors have been produced either from sheet metal, duroplastics (BMC), or metal-plated, injection molded amorphous high Tg thermoplastics (PCHT, PEI, PSU, PES). The high tolerance requirements, coupled with the surface quality of the injection molded parts necessary for the metal coating, have been primarily fulfilled until now by unfilled amorphous high Tg thermoplastics or lacquered duroplastics.

An example of one of the cited high Tg thermoplastics is the polyethersulfone ULTRASON E® from BASF Ludwigshafen, Germany (having an iridescence temperature of 212°

C.), as is described in the publication cited in the following. In the course of the continuing reduction in complexity, there is currently increasing integration of headlight components into highly developed illumination systems, which will have higher material requirements. P. Queisser, M. Geprägs, R. Blum and G. Ickes, Trends bei Automobilscheinwerfern [Trends in Automobile Headlights], *Kunststoffe [Plastics]* 3/2002, Hanser Verlag, Munich].

The partially crystalline polyphenylene sulfide (PPS), which is cited in EP 0 332 122 for producing headlight reflectors, for example, also has very high thermal dimensional stability. A production method is disclosed therein, in which a reflector blank (with at most 25% carbon black added to achieve increased electrical conductivity) is injection molded in a first work step. In a second work step, the reflector blank is electrostatically lacquered to compensate for inequalities and to achieve a glossy surface, and in a third work step it is aluminum plated in vacuum. This method, because of the additional lacquering steps, is generally considered too complicated and too costly for the mass production of reflectors. In addition, it is recognized as a disadvantage that the addition of fillers lowers the fluidity of an injection molding compound and roughens the surface of the blanks thus produced. The significant lengthening of the cycle times during injection molding using such compositions in relation to amorphous polymers is seen as a further disadvantage.

Compositions are known from EP 0 696 304 which comprise (a) a first polyamide, produced from an aromatic dicarboxylic acid component (isophthalic acid and/or terephthalic acid) and an aliphatic diamine component (hexamethylene diamine and 2-methyl-1,5-pentamethylene diamine); (b) a second aliphatic (polyamide 66, polyamide 6, or polyamide 46) or partially aromatic polyamide different from the first polyamide; and (c) a mineral filler (kaolin, talc, mica, or wollastonite). It is disclosed in EP 0 696 304 that corresponding compositions having a high filler proportion of kaolin or mica (at least 40%) may achieve an HDT/A value of over 200° C., but a glossy surface is only observed in the cases in which the composition additionally comprises 10% glass fibers. However, adding such glass fibers also impairs the fluidity of the composition during injection molding of molded parts and results in an uneven surface as well as less isotropic or more strongly anisotropic contraction behavior.

A material for producing street light reflectors is known under the name MINLON® (E.I. du Pont de Nemours & Co., Wilmington, USA). The cited product is the partially crystalline nylon 66 (PA 66), which also comprises 36-40% classic mineral materials in addition to a heat stabilizer. However, this material appears unsuitable for vehicle travel lights at least in regard to the surface quality. The significant lengthening of the cycle times during injection molding using such compositions in relation to amorphous polymers is also seen as a further disadvantage.

Moreover, compositions which comprise a fibrillary, inorganic filler (cf. EP 0 863 180) and an additional granulated inorganic filler (EP 1 312 647 or EP 0 585 056), or which only comprise a granulated, inorganic filler (EP 0 913 421) are known from the prior art. The use of flame-retardant calcium magnesium carbonate hydrate additives to improve the mechanical and electrical properties is also known (cf. U.S. Pat. No. 5,389,712).

All of the compositions cited until now are either unsuitable or are only limitedly suitable for the use in producing light-reflecting components which are designed or suitable for operating temperatures of at least 200° C. either for economic reasons, because of their additives or fillers, for ecological reasons, or because of their crystallinity.

In contrast, restrictions because of material characteristics apply for the products TROGAMID® CX (PA PACM/12) and TROGAMID® T5000 (PA 6-3-T) of Degussa; however a Tg value of 140 and 153° C., respectively, makes the use in the production of light-reflecting components which are suitable for operating temperatures of at least 200° C. impossible here. This category also includes the polyamide compositions which are known from DE 102 24 947 A1. As disclosed in Table 1 of DE 102 24 947 A1, these copolyamides only have Tg values in the range from 145-150° C. auf. These copolyamides are therefore unsuitable for reflectors which must withstand operating temperatures of at least 200° C.

Further compositions without fillers are known from the prior art. However, these only achieve insufficient Tg values of less than 175° C. (cf., for example, EP 0 313 436, EP 0 553 581 and U.S. Pat. No. 4,898,896). This category of polymers inadequate for the planned use also includes polyarylamides such as IXEF® 2057 (Solvay Advanced Polymers), polyarylates, polybutylene therephthalate (PBT, such as ARNITE® TV4 220 from DSM).

The transparent, colorless, and amorphous homopolyamides disclosed in European Patent EP 0 725 101 B2 of the current applicant have a Tg value of approximately 157° C. and are suitable in any case for the production of subreflectors, but not for the production of light-reflecting components which are designed for operating temperatures of at least 200° C.

Injection-molded reflectors made of amorphous thermoplastics, such as polyetherimides, polyarylethers, polyethersulfones, polysulfones, polycarbonates, polyester carbonates, polyarylates, polyamides, polyesters, and single-phase mixtures of such thermoplastics are known from U.S. Pat. No. 6,355,723 B1. These reflectors may be provided directly with a metal coating and have a glass transition temperature (Tg) of at least 170° C. to 200° C. In order to be able to establish any surface errors before the metal coating of the reflectors surface using visual inspection and suppress undesired light effects due to parts of the reflectors which are not metal coated, all of these reflectors are colored black by admixing colorants.

OBJECT AND SUMMARY OF THE INVENTION

The object of the present invention is to suggest alternative materials which have a Tg value of more than 200° C. and using which light reflector components having an at least approximately equally good surface (which is suitable for direct coating using a metal coating) and having at least approximately equally good thermal deformation resistance may be produced as using materials known from the prior art.

This object is achieved by the features of independent claim 1, in that the use of a thermoplastic polymer molding compound for producing metallically coated light-reflecting components suitable for operating temperatures of at least 200° C. based on thermoplastics is suggested. The use according to the present invention is characterized in that the molding compound comprises polyamides which are selected from a group which comprises homopolyamides, copolyamides, and mixtures (blends) made of homopolyamides and/or copolyamides, these polyamides being selected from a group which comprises amorphous and transparent polyamides, and these polyamides having a glass transition temperature (Tg) of at least 205° C.

Preferred embodiments and further features according to the present invention result from the dependent claims.

DETAILED DESCRIPTION OF THE INVENTION

In connection with the present invention, in addition to the amorphous polyamides, "transparent polyamides" also comprise those polyamides which are no longer completely amorphous, but rather are still transparent because of their microcrystalline structure, which is invisible to the eye.

In connection with the present invention, the term "polyimide" corresponding to independent claim 1 is understood to mean:
- homopolyamides;
- copolyamides;
- mixtures (blends) made of homopolyamides and copolyamides;
- mixtures made of homopolyamides; and
- mixtures made of copolyamides.

Light-reflecting components which are subjected to increased thermal strains, particularly reflectors or possibly also subreflectors, fall under the use according to the present invention and/or under the embodiments produced according to the present invention.

Until now, it was not recognized that even glass-clear transparent polyamides having an increased Tg value of up to 192° C. (cf. DE 26 42 244 A1) could be used for producing light-reflecting components which are designed for operating temperatures of at least 190° C. Until now, no corresponding light-reflecting components made of an amorphous polyamide, which are metallically coated and are suitable for operating temperatures of at least 200° C. because of their glass transition temperature (Tg) of at least 200° C., were known either.

The preferred amorphous and/or transparent polyamides used according to the present invention in the production of light-reflecting components allow, thanks to their glass transition temperature (Tg) of at least 205° C., the cost-effective (comparatively inexpensive raw material and cost-effective production method) and timesaving production of light-reflecting components, which are suitable and/or designed for operating temperatures of at least 200° C. These amorphous and/or transparent polyamides preferably have a glass transition temperature (Tg) of at least 210° C., especially preferably at least 215° C., and very especially preferably such a Tg value of at least 220° C.

The thermal deformation resistance (HDT/A value) of light-reflecting components produced in this way may be increased further by adding inorganic fillers to the polyamide molding compound used; partially crystalline polyamides having a mineral filler, which has an ultrafine grain having a mean particle size of at most 100 nm, are known from the prior art (cf. EP 1 403 306 B1 and EP 1 416 010 A2). In spite of the filler component, blanks, which are distinguished by a smooth surface having a high gloss in the area where the mold is polished to a high gloss, may be injection molded from these polyamide molding compounds.

Partially crystalline polyamide molding compounds, which are filled with a nanoscale filler (with ultrafine chalk), based on partially aromatic copolyamides and having an increased iridescence temperature of 240° C. are known from European Patent EP 1 403 306 B1 of the current patent applicant. At most 30 to 40 weight-percent ultrafine chalk having a mean particle size of at most 100 nm and preferably at most 80 nm is used as the mineral. Especially preferably, ultrafine, uncoated, precipitated calcium carbonate having the product name "SOCAL® U1" (Solvay Chemicals S.A.) in the form of cubic particles having a mean size of 70 nm is used. Blanks based on partially crystalline, partially aromatic copolymers are suitable for use as real reflectors in the hot area of vehicle travel lights, i.e., for example, as reflectors in automobile headlights or in headlights or vehicle travel lights of other vehicles, because of their high thermal deformation resistance (high HDT/A value and high melting temperature). Such blanks also come into consideration for the production of reflectors for other (e.g., stationary) lighting facilities. The iridescence temperature is known to characterize the value at which the reflector coating begins to shimmer during step-by-step increase of the temperature, which is caused by a mechanical distortion between the polymer substrate and the metal coating because of the different thermal expansions of these materials. An iridescence temperature of approximately 240° C. was measured on a reflector produced on the basis of a PA 6T/6I (70/30). The polyamide molding compound contained 30 weight-percent ultrafine chalk having a mean particle size of 70 nm.

In addition, a method is known from European Patent Application EP 1 416 010 A2, according to which organically modified layered silicates may be implemented in the melt of the polyamide nanocomposite up to a final concentration of the layered silicates of at most 10 weight-percent (preferably from 2.5 to 6 weight-percent). The material produced is a polyamide molding compound having a partially crystalline polyamide and a mineral filler, which preferably has an ultrafine grain having a mean particle size of at most 100 nm. Exfoliated layered silicates were used as the mineral. According to a preferred example, a mixture made of partially crystalline PA 66 and amorphous PA 6I/6T was used, which is available from EMS-Chemie AG (CH-7013 Domat/Ems) under the trade name GRIVORY® GV. The phyllosilicates (layered silicates) of the three-layer type (2:1) which are preferably used include mica (e.g., muscovite, paragonite, phologopite, biotite, lepidolite, margarite), smectites (montmorillonite, hectorite), and vermiculite. Using polyamide nanocomposites of this type, by using molds polished to a high gloss, molded parts having a smooth surface and high gloss may be produced. However, these compositions are unsuitable for use in the production of light reflector components which are designed for operating temperatures of at least 200° C., because of their low thermal deformation resistance. Moreover, the cycle times during injection molding using these compositions lengthen significantly in relation to the amorphous polyamides used according to the present invention.

Furthermore, colorless, transparent copolyamides based on cycloaliphatic diamines and aromatic dicarboxylic acids (e.g., also the material which is produced and distributed under the trade name GRILAMID® TR 70 by EMS-Chemie AG and has a Tg value of 200° C.) having an increased Tg value of 195° C. to 230° C. are known from European Patent EP 0 725 100 B1 of the current patent applicant. These copolyamides are also suitable in principle for use in the production of light-reflecting components which are suitable for operating temperatures of at least 190° C. or preferably at least 200° C. However, the special intended use or the special intended possibility was also not recognized here.

Admixing the mineral filler to the polyamide in a double-screw extruder (cornpounding) is preferred as a method for producing the polyamide molding compounds. Instead of a single polyamide type (cf. the above-mentioned definition of the polyamides) the use of a polyamide blend is also possible. To obtain especially precise reflector surfaces, in a special version, gas injection technology may be used during the injection molding (see, for example, in *PLASTVERARBE-*

ITER [PLASTICS PROCESSOR], 5/2002, published by Hüthig Verlag, D-69121 Heidelberg).

It is also to be noted that the polyamide molding compounds may contain fillers and also typical additives, such as stabilizers (heat and UV stabilizers of different types), flame retardant agents, processing aids, antistatic agents, and further additives. Thus, for example, the polyamide molding compounds in EP 1 403 306 B1 and EP 1 416 010 A2 each contain a heat stabilizer.

Light-reflecting components and/or molded parts are preferably produced by injection molding or special methods of injection molding. Such special methods comprise, inter alia, injection compression, gas injection technology, and multi-component injection molding. However, all other thermoplastic shaping methods known from plastic technology (e.g., thermoforming, vacuum deep drawing, etc.) are suitable for producing light-reflecting components or parts thereof. Such methods may be applied for producing self-supporting molded bodies or for producing films and the like.

A polyamide composition which comprises dimethyl-p-diaminocyclohexyl methane (MACM), isophthalic acid (I), and laurin lactam is especially preferably suitable for the use of a thermoplastic polymer molding compound for producing light-reflecting components to be metallically coated which are suitable for operating temperatures of at least 200° C. This copolyamide composition is referred to as PA MACMI/12. A PA MACMI/12, which contains 15 weight-percent (corresponding to 14.1 mol-percent) laurin lactam and the other two components in nearly equimolar quantity, is especially preferred. This composition is available from EMS-Chemie AG under the name GRILAMID® TR FE 5596 and has a Tg value of 215° C.

If the proportion of the laurin lactam in the PA MACMI/12 is increased to 19 weight-percent (corresponding to 18.0 mol-percent), a Tg value of 205° C. still results for this polyamide composition. PA MACMI/12 compositions having a laurin lactam component in the range from 5 to 18 mol-percent are preferred, a laurin lactam component in the range from 9 to 18 mol-percent being especially preferred.

Further preferred polyamide compositions result from document EP 0 725 100 B1 of the current applicant, which is already been cited. Actually, the disclosure of this document corresponds to a generalization of the especially preferred PA MACMI/12 polyamide compositions just cited. However, in accordance with the use according to the present invention, the condition must be specified that the Tg value of the polyamide composition is at least 205° C. Correspondingly, colorless, transparent copolyamides or their blends or alloys with at least one homopolyamide are preferred for the use of a thermoplastic polymer molding compound for producing metallically coated light-reflecting components suitable for operating temperatures of at least 200° C. These polyamide compositions are characterized in that the copolyamides are synthesized from:

(a) at least one cycloaliphatic diamine having 6 to 24 C atoms, in nearly equimolar ratio with (b) isophthalic acid, which is replaced by 0 to 50 mol-percent terephthalic acid and/or naphthalene dicarboxylic acid and/or 0 to 20 mol-percent of an aliphatic dicarboxylic acid; and (c) up to 20 mol-percent of further polyamide-forming monomers;

the copolyamides having a glass transition temperature (Tg) of at least 205° C. and the copolyamides or their blends or alloys optionally containing additives related to processing or use.

For this purpose, those copolyamides which are characterized in that the polyamide-forming monomers (c) have 1 to 18 mol-percent of at least one lactam or an omega amino carboxylic acid or the nearly equimolar mixture of at least one aliphatic diamine and at least one aliphatic dicarboxylic acid, which has 6 to 12 C atoms, are preferred for this purpose. In addition, those copolyamides which are characterized in that the diamine has 15 to 21 C atoms and at least one cyclohexane ring are preferred. It is especially preferable that the substituted cycloaliphatic diamine is a bis-(3-methyl-4-aminocyclohexyl)-methane. At least a component of unsubstituted p-diaminodicyclohexylmethane (PACM) may also be used. Moreover, those copolyamides which are characterized in that the lactam is a decanolactam or a dodecanolactam are preferred.

An alternative, preferred polyamide composition comprises the cycloaliphatic diamine 3,3'-dimethyl-4,4'-diaminodicyclohexylether and is also suitable for the use according to the present invention.

A polyamide composition based on a PA MACMI/MACM12/PACMI/PACM12 composition is also preferred for the use of a thermoplastic polymer molding compound for producing light-reflecting components to be metallically coated, which are suitable for operating temperatures of at least 200° C. This copolyamide composition thus comprises the two cycloaliphatic diamine monomers MACM (dimethyl-pdiamino-cyclohexylmethane) and PACM (diaminodicyclohexylmethane), as well as the two dicarboxylic acid monomers isophthalic acid (I) and dodecane diacid. The sum of the quantities of the two diamines in the polyamide composition is approximately equimolar in the reaction to the sum of the quantities of the two dicarboxylic acids (each 100 mol-percent).

A PA MACMI/MACM12/PACMI/PACM12 which contains 46 mol-percent MACM and 54 mol-percent PACM and, in addition, 76 mol-percent isophthalic acid and 24 mol-percent dodecane diacid is especially preferred. At this percent composition, a Tg value of 221° C. was measured, and light-reflecting components produced from this composition displayed essentially the same good dimensional stability and no bubble formation upon a continuous strain of 205° C. for 4 hours as an identical component produced from ULTRASON E®. The carrying capacity of the component according to the present invention was even 10° C. higher in this comparison.

Applications of the use according to the present invention comprise the production of corresponding light-reflecting components made of a thermoplastic polymer molding compound which are metallically coated and suitable for operating temperatures of at least 200° C. A primer layer for producing special optical effects may optionally be situated between the polyamide component and the metallic coating. Light-reflecting components in which the metal coating is applied through vapor deposition methods are especially preferred.

Applications of the use according to the present invention comprise the production of light-reflecting components, reflectors for illumination, particularly for travel illumination, of vehicles of all type on land, on water, and in the air. The use according to the present invention is especially preferred for the production of light-reflecting components in vehicle travel lights, such as headlights, low beam lights, daytime running lights, or fog lights of motor vehicles, ships, air cushion vehicles, and aircraft.

Further applications of the use according to the present invention comprise the production of light-reflecting components which are reflectors for signal devices which are selected from a group comprising the traffic signals for vehicles of all types on land, on water, and in the air. The use according to the present invention is especially preferred for the production of light-reflecting components in signal devices, such as in warning blinkers, in particular in warning blinkers in fixed street signals or in temporary use, e.g., at construction sites; positioning lights, in particular positioning lights on vehicles of all types, positioning lights of harbor entries and approach signals on airports; as well as in navigation lights of light houses and in lights of street signals and advertising signals of all types.

Further applications of the use according to the present invention comprise the production of light-reflecting components which are reflectors for lighting devices which are selected from a group which comprises streetlights, floodlight facilities, and medical operation lights. Special reflectors, such as mirrors on medical operation lights, are known to have reflective layers which reflect only a part of light (above all in the cool range far from the infrared).

Further applications of the use according to the present invention comprise the production of light-reflecting components which are reflectors for solar collectors, which are selected from a group which comprises planar collectors, parabolic mirrors, trough mirrors, and mixed shapes thereof.

The operating time may be up to many hours in accordance with the particular application of the light-reflecting components produced according to the use according to the present invention. Thus, for example, reflectors in daylight travel lighting of utility vehicles are often under operational load for multiple hours uninterruptedly. Blinking facilities which are to secure construction sites are often in use over multiple days and accordingly subjected to high temperatures, although the individual time alight of the blinking light is only very short (in the range of seconds or fractions of a second).

What is claimed is:

1. A method for the production of a metallically coated light-reflecting component made of a thermoplastic polymer molding compound, the metallically coated light-reflecting component being suitable for operating temperatures of 200° C. or higher than 200° C., which method comprises:
   (a) producing a thermoplastic polymer molding compound;
   (b) producing a light-reflecting component or parts thereof by a thermoplastic shaping method; and
   (c) coating the light-reflecting component or parts thereof with a metallic layer;
   wherein the thermoplastic polymer molding compound is based on a co-polyamide which consists of a colorless, amorphous and transparent PA MACMI/MACM12/PACMI/PACM12 composition having a glass transition temperature (Tg) of 221° C., said composition containing 46 mol-percent MACM and 54 mol-percent PACM and, in addition, 76 mol-percent isophthalic acid and 24 mol-percent dodecane diacid, so that the sum of the quantities of the two diamines in the composition is approximately equimolar in the reaction to the sum of the quantities of the two dicarboxylic acids, the diamines and the dicarboxylic acids each amounting to 100 mol-percent.

2. The method of claim 1, wherein the co-polyamide molding compound used comprises an ultrafine, nanoscale mineral filler having a mean particle size of equal to or less than 100 nm.

3. The method of claim 2, wherein the co-polyamide molding compound used comprises an ultrafine, nanoscale mineral filler having a mean particle size of equal to or less than 80 nm or optionally equal to or less than 70 nm.

4. The method of claim 2, wherein the ultrafine, nanoscale mineral filler is ultrafine chalk (CaCO$_3$), the co-polyamide molding compound used having equal to or less than 40 weight-percent of the ultrafine chalk.

5. The method of claim 4, wherein the co-polyamide molding compound used having 20 to 35 weight-percent of the ultrafine chalk.

6. The method of claim 1, wherein the co-polyamide molding compound used comprises a mineral filler in the form of organically modified phyllosilicates having a mean particle size of equal to or less than 100 nm.

7. The method of claim 6, wherein the co-polyamide molding compound used has equal to or less than 15 weight-percent of the modified phyllosilicates.

8. The method of claim 7, wherein the co-polyamide molding compound used has 2.5 to 10 weight-percent of the modified phyllosilicates.

9. The method of claim 1, wherein said shaping method comprises injection molding techniques to produce light-reflecting components which are suitable for operating temperatures of at least 200° C. and are to be metallically coated.

10. A light-reflecting component, produced from a polymer molding compound based on thermoplastics, which is metallically coated and suitable for operating temperatures of at least 200° C.,
   wherein the molding compound for producing said light-reflecting component is based on a co-polyamide which consists of a colorless, amorphous and transparent PA MACMI/MACM12/PACMI/PACM12 composition having a glass transition temperature (Tg) of 221° C., said composition containing 46 mol-percent MACM and 54 mol-percent PACM and, in addition, 76 mol-percent isophthalic acid and 24 mol-percent dodecane diacid, so that the sum of the quantities of the two diamines in the composition is approximately equimolar in the reaction to the sum of the quantities of the two dicarboxylic acids, the diamines and the dicarboxylic acids each amounting to 100 mol-percent.

11. The light-reflecting component according to claim 10, wherein the co-polyamide component is metal coated directly.

12. The light-reflecting component according to claim 10, wherein a primer layer is situated between the co-polyamide component and the metal coating.

13. The light-reflecting component according to claim 10, wherein the metal coating is a vapor deposited coating.

14. The light-reflecting component according to claim 10, wherein the co-polyamide molding compound used comprises an ultrafine, nanoscale mineral filler having a mean particle size of equal to or less than 100 nm.

15. The light-reflecting component according to claim 14, wherein the co-polyamide molding compound used comprises an ultrafine, nanoscale mineral filler having a mean particle size of equal to or less than 80 nm or optionally equal to or less than 70 nm.

16. The light-reflecting component according to claim 14, wherein the ultrafine, nanoscale mineral filler is ultrafine chalk (CaCO$_3$), the co-polyamide molding compound used having equal to or less than 40 weight-percent of the ultrafine chalk.

17. The light-reflecting component according to claim 16, wherein the co-polyamide molding compound used having 20 to 35 weight-percent of the ultrafine chalk.

18. The light-reflecting component according to claim 10, wherein the co-polyamide molding compound used comprises a mineral filler in the form of organically modified phyllosilicates having a mean particle size of equal to or less than 100 nm.

19. The light-reflecting component according to claim 18, wherein the co-polyamide molding compound used has equal to or less than 15 weight-percent of the modified phyllosilicates.

20. The light-reflecting component according to claim 19, wherein the co-polyamide molding compound used has 2.5 to 10 weight-percent of the modified phyllosilicates.

21. The light-reflecting component according to claim 10, which is an injection molding component produced using injection molding technology or special methods of injection molding technology.

22. The light-reflecting component according to claim 10, which is a reflector for a traveling light of a vehicle which is selected from the group consisting of motor vehicles, ships and aircraft.

23. The light-reflecting component according to claim 10, which is a reflector for a signal device, which is selected from the group consisting of warning blinkers, approach signals on airports, navigation lights of light houses, traffic signals, positioning lights, and lights of road and advertising signals.

24. The light-reflecting component according to claim 10, which is a reflector for a lighting device selected from the group consisting of streetlights, floodlight facilities, and medical operation lights.

25. The light-reflecting component according to claim 10, which is a reflector for a solar collector selected from the group consisting of a planar collector, a parabolic mirror, a trough mirror, and mixed forms thereof.

26. The light-reflecting component according to claim 10, which is a light-reflecting component for a vehicle light, selected from the group consisting of head lights, low beam lights, daytime running lights, and fog lights.

* * * * *